United States Patent [19]
Kosuge

[11] Patent Number: 5,438,358
[45] Date of Patent: Aug. 1, 1995

[54] IMAGE SIGNAL CONVERSION SYSTEM

[75] Inventor: Shouji Kosuge, Kanagawa, Japan

[73] Assignee: Sony Corporation, Tokyo, Japan

[21] Appl. No.: 206,895

[22] Filed: Mar. 4, 1994

Related U.S. Application Data

[63] Continuation of Ser. No. 858,592, Mar. 27, 1992, abandoned.

[30] Foreign Application Priority Data

Mar. 31, 1991 [JP] Japan ................... 3-093688

[51] Int. Cl.⁶ .................................. H04N 9/11
[52] U.S. Cl. ........................... 348/96; 348/97; 348/99; 348/100
[58] Field of Search ................... 348/96–103, 348/106, 108, 209, 210; H04N 9/11

[56] References Cited

U.S. PATENT DOCUMENTS

| | | | |
|---|---|---|---|
| 3,769,574 | 10/1973 | Millward | 358/214 |
| 4,255,764 | 3/1981 | Howe | 348/98 |
| 4,356,514 | 10/1982 | Armstrong et al. | 358/214 |
| 4,630,120 | 12/1986 | Childs | 358/214 |
| 4,823,204 | 4/1989 | Holland | 358/347 |
| 4,875,102 | 10/1989 | Poetsch | 358/214 |
| 4,901,161 | 2/1990 | Giovanella | 348/96 |
| 4,903,131 | 2/1990 | Lingemann et al. | 358/214 |
| 4,914,520 | 4/1990 | Beard | 348/97 |
| 5,016,101 | 5/1991 | Richards | 348/97 |
| 5,084,755 | 1/1992 | Ozaki | 348/97 |
| 5,177,615 | 1/1993 | Ojaki et al. | 348/97 |
| 5,191,427 | 3/1993 | Richards et al. | 348/97 |

Primary Examiner—Michael T. Razavi
Assistant Examiner—Bipin Shalwala
Attorney, Agent, or Firm—William S. Frommer; Alvin Sinderbrand

[57] ABSTRACT

An image signal conversion apparatus converts an image signal outputted from an image signal generation means into a film record signal in an image signal conversion means, and forms an image on a predetermined film on the basis of the film record signal. A first reference signal for controlling the image signal conversion means is generated on the basis of time information of the image signal generation means, and then a second reference signal for controlling a film recording means is generated on the basis of the first reference signal. Thereby the image signal conversion means and the film recording means can accurately synchronize with the image signal generation means.

7 Claims, 4 Drawing Sheets

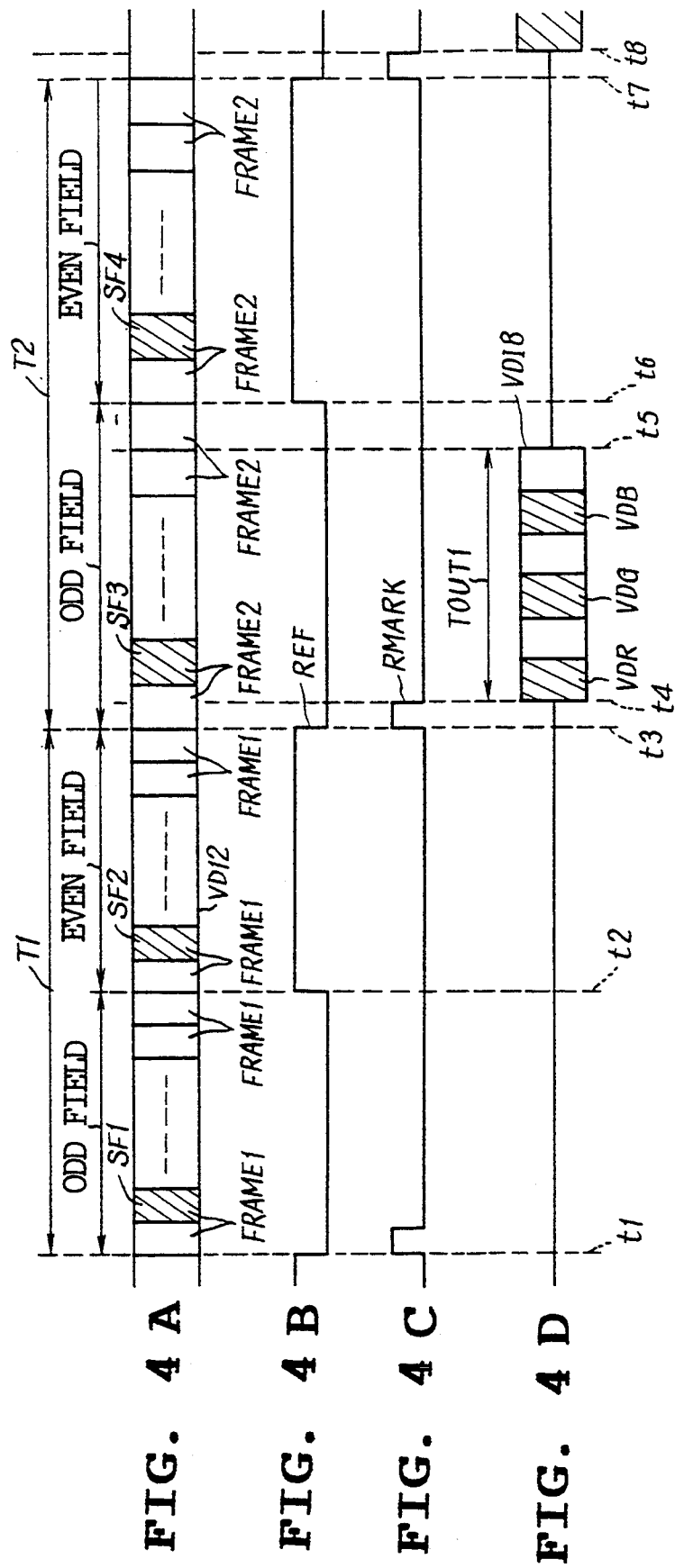

IMAGE SIGNAL CONVERSION SYSTEM

This application is a continuation of application Ser. No. 07/858,592, filed Mar. 27, 1992, now abandoned.

BACKGROUND OF THE INVENTION

This invention relates to an image signal conversion system, and is suitably applied to formation of pictorial image, which has been shot by a video camera, for example, on a movie film.

There is a conventional electronic beam recorder (EBR) as an image signal conversion system which forms an image, which has been shot by a video camera, on a movie film.

More specifically, in an image signal conversion 1 (shown in FIG. 1) having an electronic beam recorder (EBR), video image signals VD1 which have been received from a video camera 2 are temporarily recorded in a recording video tape recorder (VTR) 3. Then, the signals are low speed reproduced by a low speed reproduction VTR 4 to be inputted to an EBR device 5.

In the EBR device 5, video image signals VD2 which are low speed reproduction image signals are inputted to an image signal conversion circuit unit 6 where the signals undergo a predetermined signal processing to produce film record signals VD3, which are inputted to a beam gun 8 of an EBR unit 15 following. The film record signals VD3 are produced by sequentially and intermittently outputting each of red, green and blue components of one frame of image data.

An electronic beam BM is scanned by beam gun 8 over a black and white film 9, and is modified in intensity by the film record signals VD3 inputted, so that a color picture is formed only in contrast on the black and white film 9 by film record signals VD3.

In the pictures formed on the black and white film 9, each frame is assigned to every one of red, green and blue components of a frame of picture which have been intermittently outputted from the image signal conversion circuit unit 6 as shown in FIG. 2.

More specifically, in the EBR unit 15 a red component contrast image FR1 is formed by recording a red component contract of film record signals VD3 in a first record region of the black and white film 9, and thereafter the black and white film 9 is fed one frame and is then stopped. Then, a green component contrast image FG1 is formed by recording a green component contract of film record signals VD3 in the second record region, and thereafter the black and white film 9 is further fed one frame and is then stopped. Then, a blue component contrast image FB1 is formed by recording a blue component contract of film record signals VD3 in the subsequent third record region.

In contrast images FR1, FG1 and FB1 of respective red, green and blue components of each of reproduced images which have been outputted from the low speed reproduction VTR 4 are then sequentially formed on the black and white film 9 in the described order.

Contrast images FR1, FG1 and FB1 of respective primary colors formed on the black and white film 9, the red component contrast image FR1 is recorded in a first recording region on a color negative film 11 through a red filter R of a filter 10, the green component contrast image FG1 is recorded in the first recording region on the color negative film 11 through a green filter G of the filter 10, and the blue component contrast image FB1 is recorded in the first recording region on the color negative film 11 through a blue filter B of the filter 10. Thus, a color negative image FCOLN which is formed by superposing the red, the green and the blue components is formed in the first record region of the color negative film 11.

The images of the color negative film 11 are printed to a color positive film 12, which is thereby used as a movie film.

In the image signal conversion system 1 having the electronic beam recorder, image signals are outputted from the low speed reproduction VTR 4 at a 1/30 low speed of the ordinary image transmission speed, and in the image signal conversion circuit unit 6 and the EBR unit 15, operations of the signal processing system are preset to the transmission speed of the image signals.

Accordingly, in the image signal conversion circuit unit 6 and the EBR unit 15 operations proceed on the basis of the time preset, and there is therefore a problem in that image oscillation is generated in images formed on the film since a small variation in speed of image signals outputted from the low speed reproduction VTR 4 causes both signal processing operation of the image signal conversion circuit unit 6 and speed of inputted image signals to be shifted.

As one method to solve this problem, there is considered a method to make the low speed reproduction quality of the low speed reproduction VTR 4 improve highly accurate by redesigning the low speed reproduction VTR 4.

An attempt to make redesign all of the low speed reproduction VTR used in the image signal conversion system 1 to redesign makes it less easy to fabricate the image signal conversion system 1, and hence such a solution is still insufficient.

SUMMARY OF THE INVENTION

In view of the foregoing, an object of this invention is to provide an image signal conversion system which is capable of synchronize of all the signal processing systems without redesigning the low speed reproduction VTR.

The foregoing object and other objects of the invention have been achieved by provision of image signal conversion apparatus 20 in which image signals VD12 outputted from image signal generation means 23 are converted to film record signals VD18 by image signal conversion means 24, on which an image is formed on a predetermined film 9 by a film recording means 15: a first reference signal REF for controlling the image signal conversion means 24 is generated on the basis of time information VITC from the image signal generation means 23; a second reference signal RMARK for controlling the film recording means 15 on the basis of the first reference signal REF; and the image signal conversion means 24 and the film recording means 15 are controlled on the basis of the first reference signal REF and second reference signal RMARK, respectively.

A first reference signal REF is produced on the basis of time information VITC from the image signal generation means 23, and the image signal conversion means 24 is controlled by the first reference signal REF. A second reference signal RMARK is produced on the basis of the first reference signal REF, and the film record means 15 is controlled by the second reference signal RMARK. In this manner, the image signal generation means 23 and the film record means 15 are sequentially controlled on the basis of the time information VITC from the image signal generation means 23. The image signal conversion means 24 and the film record means 15 can be positively synchronized with the image signal generation means 23.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4A–4D is a signal waveform diagram illustrating the control operation based on the reference signals.

DETAILED DESCRIPTION OF THE INVENTION

Figure 1:
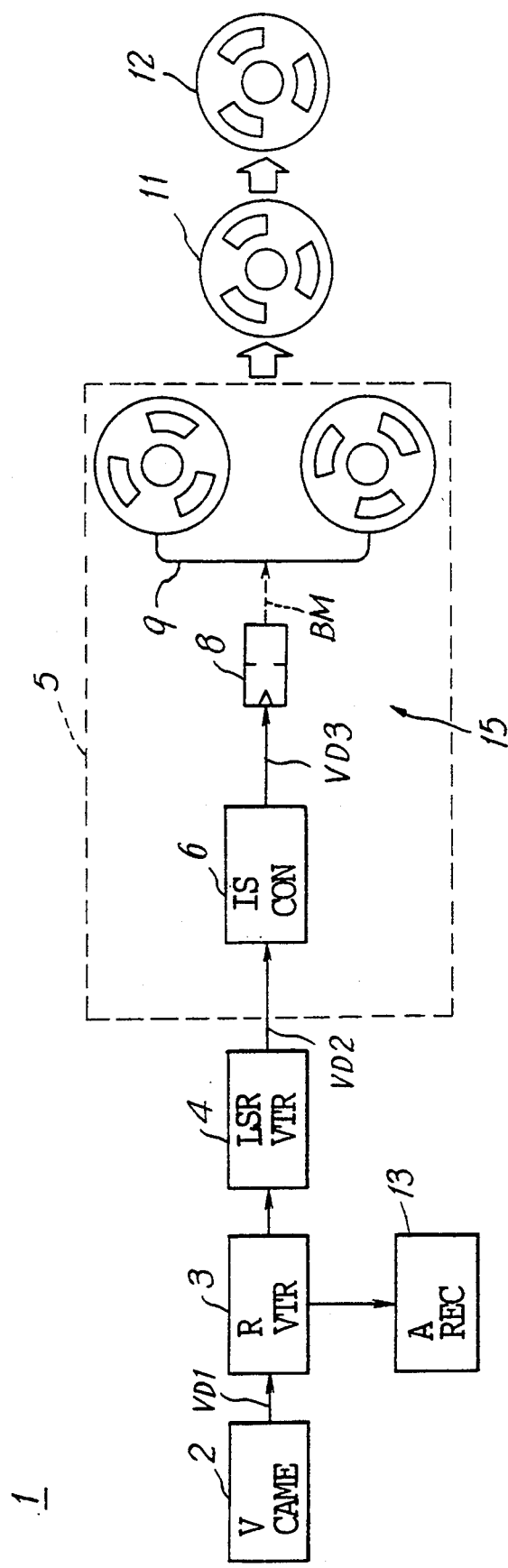
FIG. 1 is a block diagram showing the conventional image signal conversion apparatus composed having an electronic beam recorder.
Figure 2:
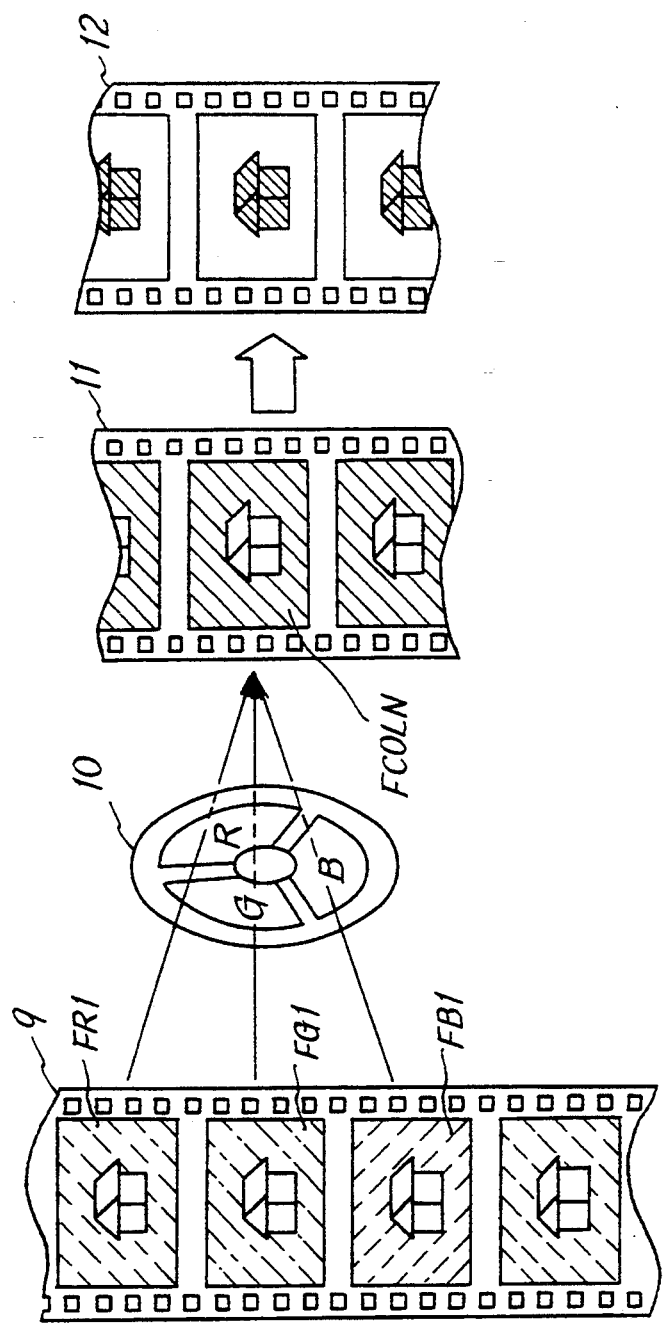
FIG. 2 is a schematic diagram illustrating conversion of images onto a film.
Figure 3:
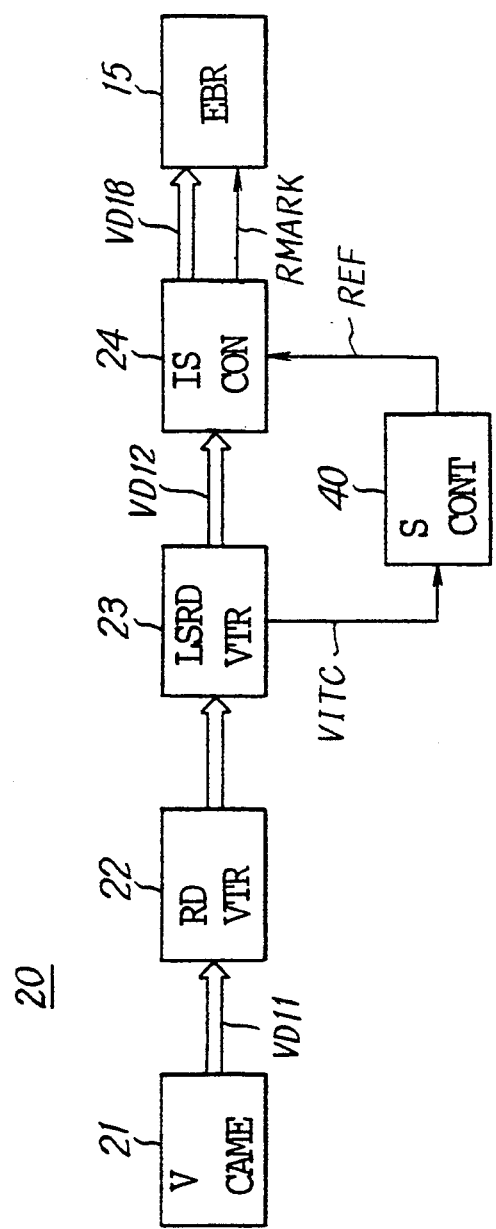
FIG. 3 is a block diagram illustrating the one embodiment of the image signal conversion apparatus according to the present invention.

Preferred embodiments of this invention will be described with reference to the accompanying drawings:

In FIG. 3 in which same reference characters are allotted to parts corresponding to parts of FIG. 1, an image signal conversion apparatus 20 has an electronic beam recorder (EBR) which is fabricated to form high definition pictures of high definition digital system, which have been shot by a video camera 21, on a movie film. Video image signals VD11 which have been obtained from the video camera 21 are temporarily recorded in a recording digital VTR 22, and then in the following low speed reproduction digital VTR 23, there is obtained video image signal data VD12 which has been produced by converting video signals VD11 to 1/30 low speed images according to the characteristic of the black and white film 9 (FIG. 2), the video signals VD11 representing video data of continuous 30 frames for one [second].

This conversion rate (1/30) is such that the time assigned to signals of one frame of the video signals VD11 is divided by the time to record the images of one frame of the video signals VD11 on the black and white film 9 in the EBR unit 15.

A method of conversion to such low speed images is illustrated in FIG. 4A. The video image signal data VD12 is constituted by repeating images of the same frame 30 times at T1 [second] (e.g. one [second]): the repeated images of the first half 15 times are allotted to odd field (odd FIELD) while the repeated images of the second half 15 times are allotted to even field (even FIELD). Thus, still images of one frame are formed for one [second].

Repeated images which form the still images are sequentially switched every one [second], and thereby low speed reproduction images such that scenes proceed every one [second] are obtained.

The video image signal data VD12 thus constructed is inputted to the following image signal conversion circuit unit 24. Image data for a time is sampled as a sample frame SF1 among 15 times repeated image data which constitutes odd field (odd FIELD) whereas image data for a time is sampled as a sample frame SF2 among 15 times repeated image data which constitutes even field (even FIELD). Film recording image data of one frame which corresponds to low speed reproduction images of one frame is produced by the sample frames SF1 and SF2.

The image signal conversion circuit unit 24 decreases the clock frequency (74.25 [MHz] in this embodiment), which sends out the digital image signals, to a predetermined frequency to meet the TTL/MOS hardware which constitutes the image signal conversion circuit unit 24. In a predetermined digital matrix circuit the image signal conversion circuit unit 24 further divides image data of one frame into red, green, and blue component data VDR, VDG and VDB.

The image signal conversion circuit unit 24 includes: a linearizer for restoring and amending the gamma characteristic, which has been preliminary amended for inputted image data by the video camera 21, to the original characteristic; color amendment circuit unit which executes numeric operation between the red, green and blue components to meet the color reproduction characteristic of the film; and a gamma circuit unit which makes gamma amendment to image data to meet the density characteristic of the film. The inputted image data is subjected to these kinds of processing, and is then inputted to a memory unit consisting of two planes for storing image data in the unit of one fame.

In this two plane memory unit, writing and reading are alternatively repeated in the image data unit of one frame which includes red, green and blue component data VDR, VDG and VDB. As shown in FIG. 4D, red, green and blue component data VDR, VDG and VDB are sequentially and intermittently outputted in response to the feed operation of the film 9 within time TOUT1 (one [second] in this embodiment) to form an image on the film.

Accordingly, film record data VD18 which outputs each of red, green and blue component data VDR, VDG and VDB for a period of about 0.15 [second] with a time interval of about 0.15 [second].

Film record data VD18 is sent out from the image signal processing circuit unit 24 to the EBR unit 15 through a digital analog conversion circuit at timing and clock rate according to both the deflection of the electronic beam BM (FIG. 1) and the frame feeding operation of the film, and contrast images FR1, FG1 and FB1 (FIG. 2) of respective primary colors are formed on the black and white film 9 (FIG. 1).

Here, on the basis of the time information VITC outputted from the low speed reproduction digital VTR 23, the system control circuit 40 generates a reference signal REF as shown in FIG. 4B and sends it to the image signal conversion circuit unit 24.

This reference signal REF is set to fall at timing t3 and t7 when periods T1 and T2, during which frames FRAME1, FRAME2, . . . (FIG. 4A) of video image data VD12, sent out from the low speed reproduction digital VTR 23, are each repeated 30 times, end. The image signal conversion circuit unit 24 stores sample frames SF1 and SF2 of inputted video image data VD12 in the memory unit within a range of an allowable error of 1/30 ±10 [%] of the speed of the image data VD12 according to the reference signal REF.

In the image signal conversion circuit unit 24, the sampling of the sample frames SF1 and SF2 of the first frame FRAME1 is completed at the time t3 when the reference signal REF falls, and hence it is possible to output film record data VD18 (FIG. 4D) of the one frame to be recorded on the film.

Additionally, the image signal conversion circuit unit 24 sends out a data transmission signal RMARK (FIG. 4C) to the EBR unit 15 together with the film record data VD18 (FIG. 4D), the data transmission signal RMARK being set to rise for a predetermined period from the time t3 to the time t4.

The EBR unit 15 resets a counter, incorporated in it, by the data transmission signal RMARK, and receives the film record data VD18.

After the input of the film record data VD18 is thus completed at a time t5, the EBR unit 15 waits for input of the subsequent data transmission signal RMARK.

The image signal conversion circuit unit 24 sends out data transmission signal RMARK and film record data of the frame FRAME2 to the EBR unit 15 according to the reference signal REF when sampling of sample frames SF3 and SF4 of the frame FRAME2 of the image data VD12, which has been outputted from the low speed reproduction digital VTR 23 at a time t7 during the interval T2, is completed, the reference signal REF rising at the time t7.

Thus, the EBR unit 15 executes an operation to record images of the film record data VD18 on the black and white film 9 every time when the data transmission signal RMARK is inputted.

In the image signal conversion apparatus 20 having the electronic beam recorder with the foregoing configuration, the reference signal REF is generated on the basis of time information VITC of the video image data VD12, the image signal conversion circuit unit 24 is controlled on the basis of the reference signal REF, and the data transmission signal RMARK is produced on the basis of the reference signal REF. The EBR unit 15 is controlled by the data transmission signal RMARK. Thus, even in a case where the first interval T1 and the second interval T2 are different due to a time error of the low speed reproduction digital VTR 23, the image signal conversion circuit unit 24 and the EBR unit 15 may be controlled in response to this difference, frames FRAME1 being repeatedly outputted during the first time interval T1 as shown in FIG. 4 whereas frames FRAME2 are repeatedly outputted during the second time interval T2.

Thus, the image signal conversion circuit unit 24 and the EBR unit 15 can be positively synchronized with the low speed reproduction digital VTR 23, and this enables conventional modification operation, such as to greatly-enhance operation time accuracy of the low speed reproduction digital VTR 23 to meet the operation times of the image signal conversion circuit unit 24 and the EBR unit 15, to be avoided.

According to the configuration previously described, the reference signal REF to control the image signal conversion circuit unit 24 is produced on the basis of time information from the low speed reproduction digital VTR 23, and on the basis of the reference signal REF, a data transmission signal RMARK is produced for controlling the EBR unit 15. Thus, the other signal processing units (24 and 15) may be synchronized without modifying the low speed reproduction digital VTR 23.

In the embodiment previously described, there is described the case in which the time TOUT1 to record a picture of one frame on a black and white film 9 is set to one [second], but the present invention is not limited to such a case and the time TOUT1 may be set to a different time period.

In the embodiment, the EBR recorder is described in which according to digital video image signals of a high definition digital pictures are formed on a movie film. The present invention is not limited to this but may be widely applied to cases in which various video images are converted onto a movie film.

According to the present invention, as previously described, the first reference signal to control the image signal conversion means is produced on the basis of time information from the image signal generation means, and the second reference signal which is to control the film record means is produced on the basis of the first reference signal. There is thus realized the electronic beam recorder which is capable of positively synchronizing the image signal conversion means and the film record means with the image signal generation means.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. Apparatus for recording on film images derived from video image signals obtained from a plurality of video frames, said apparatus comprising:
    means receiving the video image signals at a first rate for supplying reproduced image signals at a second rate so as to obtain low speed image signals with a timed relationship between the low speed image signals of each of said frames and for producing timing information relating to said timed relationship between said low speed image signals for supply therefrom, wherein the low speed image signals are formed by repeating the video image signals of each of said frames 30 times, in which a first 15 repeated video image signals of each of said frames represent an odd field therein, while a second 15 repeated video image signals of each of said frames represent an even field therein;
    means for generating a first reference signal on the basis of said timing information;
    means receiving said low speed image signals and said first reference signal and being controlled by said first reference signal for converting said low speed image signals to film record signals and for generating a second reference signal on the basis of said first reference signal; and
    film recording means controlled by said second reference signal for receiving said film record signals and for recording the images relating thereto on said film.

2. The apparatus according to claim 1, wherein said film recording means includes an electronic beam recorder for forming the images on said film.

3. The apparatus according to claim 2, wherein the second reference signal is a data transmission signal which indicates a start of the transmission of said film record signals to said film recording means.

4. The apparatus according to claim 1, wherein said means for converting starts converting said low speed image signals to said film record signals after receiving said first reference signal.

5. The apparatus according to claim 1, wherein said means for supplying and producing includes a recording digital video tape recorder for recording the video image signals, and a low speed reproduction digital video tape recorder for converting the video image signals obtained from said recording digital video tape recorder to said low speed image signals according to a characteristic of a black and white film, and wherein said film record signals respectively represent red, green and blue components in each of said frames which are recorded on said black and white film by said film recording means as respective contrast images representing the red, green and blue components.

6. Apparatus for recording on film images derived from video image signals obtained from a plurality of video frames, said apparatus comprising:

means receiving the video image signals at a first rate for generating reproduced image signals at a second rate by repeating the video image signals of each of said frames 30 times, in which a first 15 repeated video image signals of each of said frames represent an odd field therein and a second 15 repeated video image signals of each of said frames represent an even field therein, so as to obtain low speed image signals with a timed relationship between the low speed image signals of each of said frames;

means for producing timing information relating to said timed relationship between the low speed image signals and for supplying said timing information therefrom;

means for generating a first reference signal which indicates a start and completion of each of the first and second 15 repeated video image signals;

means controlled by said first reference signal for converting said low speed image signals to film record signals and for generating a second reference signal at the start of one of the first and second 15 repeated video image signals; and film recording means controlled by said second reference signal for receiving said film record signals and for recording the images relating thereto on said film.

7. The apparatus according to claim 1, wherein said first reference signal indicates a start and completion of said low speed image signals of each of said frames.

* * * * *